(12) United States Patent
Maruno et al.

(10) Patent No.: US 11,573,169 B2
(45) Date of Patent: Feb. 7, 2023

(54) METHOD OF TESTING A SEMICONDUCTOR ELEMENT WITH IMPROVED PRESSING FORCE DIRECTION

(71) Applicant: NICHIA CORPORATION, Anan (JP)

(72) Inventors: Atsushi Maruno, Anan (JP); Wataru Okamoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 263 days.

(21) Appl. No.: 17/033,290

(22) Filed: Sep. 25, 2020

(65) Prior Publication Data

US 2021/0096058 A1    Apr. 1, 2021

(30) Foreign Application Priority Data

Sep. 27, 2019  (JP) .............................. JP2019-176959
Jun. 15, 2020  (JP) .............................. JP2020-103049

(51) Int. Cl.
*G01N 3/00*  (2006.01)
*G01N 19/04*  (2006.01)
*G01N 3/08*  (2006.01)

(52) U.S. Cl.
CPC ................ *G01N 19/04* (2013.01); *G01N 3/08* (2013.01)

(58) Field of Classification Search
None
See application file for complete search history.

(56) References Cited

FOREIGN PATENT DOCUMENTS

| JP | 2003-149132 A | 5/2003 |
|---|---|---|
| JP | 2004-311623 A | 11/2004 |
| JP | 2013-4802 A | 1/2013 |
| JP | 2014-57017 A | 3/2014 |
| JP | 2015-87342 A | 5/2015 |
| JP | 2017-163014 A | 9/2017 |

*Primary Examiner* — Lisa M Caputo
*Assistant Examiner* — Nigel H Plumb
(74) *Attorney, Agent, or Firm* — Birch, Stewart, Kolasch & Birch, LLP

(57) ABSTRACT

A method of conducting a shear strength test on a semiconductor element with improved pressing force direction includes pressing a peripheral surface of the semiconductor element with a shear tool in a direction inclined to gradually head away from the surface of the substrate along the direction of pressing to conduct a shear strength test with a die shear strength tester.

14 Claims, 5 Drawing Sheets

METHOD OF TESTING A SEMICONDUCTOR ELEMENT WITH IMPROVED PRESSING FORCE DIRECTION

CROSS-REFERENCE TO RELATED APPLICATION

This application is based upon and claims priority to Japanese Patent Application No. 2019-176959 filed on Sep. 27, 2019, and Japanese Patent Application No. 2020-103049 filed on Jun. 15, 2020, the disclosures of which are hereby incorporated by references in their entireties.

BACKGROUND

The present disclosure relates to a method of testing the bond strength of a semiconductor element.

Semiconductor elements are usually bonded to substrates. For example, JP2017-163014A discloses a method of measuring the bond strength between a semiconductor element and a substrate by inserting a hook provided at the tip of a shear tool into the space made by bonding the semiconductor element to the substrate and pulling the semiconductor element up perpendicularly to the surface of the substrate with the hook of the shear tool to detach the semiconductor element.

One object of certain embodiments of the present invention is to provide a method of easily testing a semiconductor element for the bond strength.

SUMMARY

A method of testing a semiconductor element bonded to a surface of a substrate for a bond strength according to one aspect of the present invention includes pressing a peripheral surface of the semiconductor element with a shear tool in a direction inclined to gradually head away from the surface of the substrate along the direction of pressing.

A method of testing a semiconductor element bonded to a surface of a substrate for a bond strength according to another aspect of the present invention includes pressing a peripheral surface of the semiconductor element with a shear tool in a direction parallel to the surface of the substrate, the shear tool having, as a pressing portion to be brought into contact with the semiconductor element, an inclined surface inclined with respect to the direction of pressing.

A method of testing a semiconductor element according to still another aspect of the present invention allows for easily testing the bond strength of a semiconductor element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION

Figure 1A:
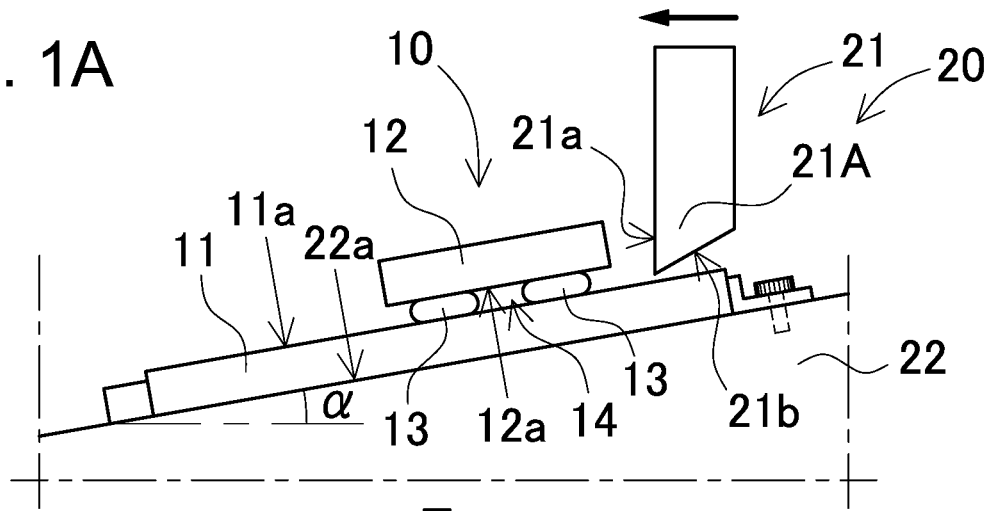
FIG. 1A to FIG. 1C schematically illustrate a method of testing a semiconductor element according to a first embodiment.

Certain embodiments of the present invention may be defined by the configurations and features described below.

In addition to any of the above configurations, in a method of testing a semiconductor element according to one embodiment, the surface of the substrate, which is bonded to the semiconductor element, may be inclined downward along the direction of pressing with the shear tool. The direction of pressing with the shear tool is easily caused to be inclined with respect to the surface of the substrate because the surface of the substrate, which is bonded to the semiconductor element, is inclined downward along the direction of pressing with the shear tool in the above method.

In addition to any of the above configurations, in a method of testing a semiconductor element according to another embodiment, the direction of pressing with the shear tool may be a horizontal direction. The semiconductor element is pressed in a direction inclined with respect to the surface of the substrate while the direction of pressing with the shear tool is the horizontal direction in the above method, so that a mechanism for moving the shear tool can be simplified.

In addition to any of the above configurations, in a method of testing a semiconductor element according to still another embodiment, an angle ($\alpha$) of inclination of the direction of pressing with respect to the surface of the substrate may be 5° or more. The magnitude of the component force that is intended to detach the semiconductor element perpendicularly to the substrate is 9% or more of the pressing force exerted by the shear tool in the above method because the angle ($\alpha$) of inclination of the direction of pressing with the shear tool with respect to the surface of the substrate is 5° or more, so that the detaching force more effectively acts.

A method of testing a semiconductor element bonded to a surface of a substrate for a bond strength according to an embodiment of the present invention includes pressing a peripheral surface of the semiconductor element with a shear tool in a direction parallel to the surface of the substrate, the shear tool having, as a pressing portion to be brought into contact with the semiconductor element, an inclined surface inclined with respect to the direction of pressing.

The peripheral surface of the semiconductor element is pressed with the shear tool in a direction inclined to gradually head away from the surface of the substrate in the above method, so that a portion of the pressing force (F) exerted by the shear tool acts as the detaching force (F1) that is intended to detach the semiconductor element perpendicularly to the surface of the substrate. Hence, in this testing method, the pressing force (F) exerted by the shear tool acts not only in the shear direction but also in the detaching direction of the joint of the semiconductor element. That is, the pressing force exerted by the shear tool also acts in a direction other than the direction of pressing. This configuration makes the motion of the shear tool in the test of the bond strength simpler, so that the bond strength of the semiconductor element can be easily tested.

Also in this method, the pressing force exerted by the shear tool also acts in a direction other than the direction of pressing. This configuration makes the motion of the shear tool in the test of the bond strength simpler, so that the bond strength of the semiconductor element can be easily tested.

In addition to any of the above configurations, in a method of testing a semiconductor element according to still another embodiment, a tip of the shear tool may have a projection protruding toward the semiconductor element, and the inclined surface may be a portion of the projection. By bringing the shear tool having the inclined surface into contact with the semiconductor element, a shear test can be performed by applying a stress in a direction in which the semiconductor element is detached from the surface of the substrate.

In addition to any of the above configurations, in a method of testing a semiconductor element according to still another embodiment, the semiconductor element may be a light-emitting element.

In addition to any of the above configurations, in a method of testing a semiconductor element according to still another embodiment, the shear tool may press a peripheral edge of a lower surface of the semiconductor element.

In addition to any of the above configurations, in a method of testing a semiconductor element according to still another embodiment, a phosphor plate may be disposed on a surface of the light-emitting element, and the shear tool may press the phosphor plate.

In addition to any of the above configurations, in a method of testing a semiconductor element according to still another embodiment, the semiconductor element may be bonded to the substrate with a bump.

Certain embodiments of the present invention will be described below on the basis of the accompanying drawings. The embodiments below are intended to describe examples to give a concrete form to the technical concept of the present invention and are not intended to limit the present invention to the description in the embodiments below. It should be noted that sizes or positional relationships of members illustrated in each drawing may be exaggerated in order to clarify the descriptions. Furthermore, in the descriptions below, the same name or the same reference numeral represents the same member or a member made of the same material, and its duplicative description will be omitted as appropriate. A portion with the same reference numeral in a plurality of drawings represents the same or equivalent portion or member. As for each element that constitutes the embodiments of the present invention, a plurality of elements may be formed of one member so that the member serves as the plurality of elements, or conversely, a combination of a plurality of members may fulfill the function of one member. Configurations described in one embodiment may be applicable to another embodiment. The descriptions below include terms indicating specific directions or positions (such as "up", "down", "right", "left", and other terms containing these terms) as appropriate. These terms are used to facilitate understanding of the present invention referring to the drawings, and the meanings of these terms do not limit the technical scope of the present invention. The term "include" in the present specification is used to indicate both of inclusion as a separate member and inclusion as an integrated member.

First Embodiment

Figure 1B:
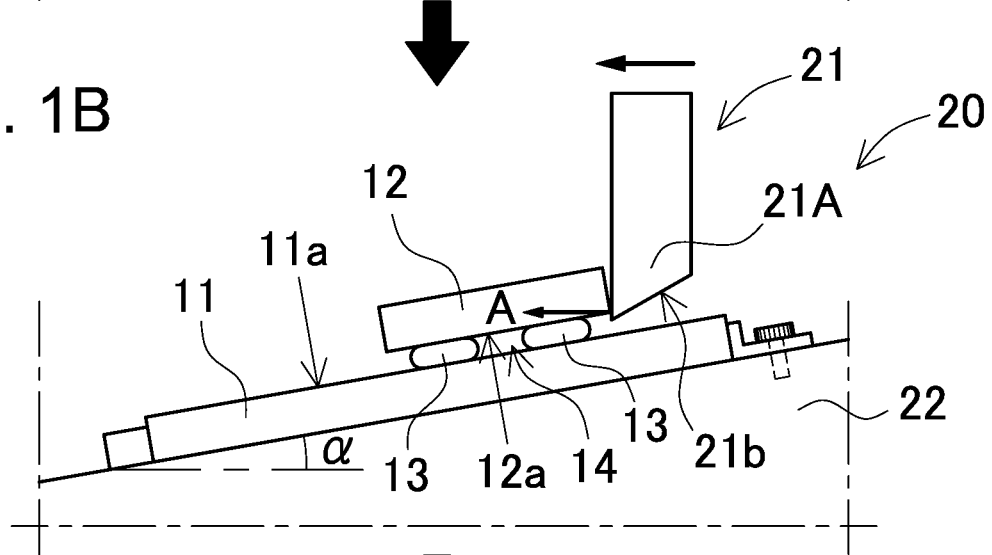
Figure 1C:
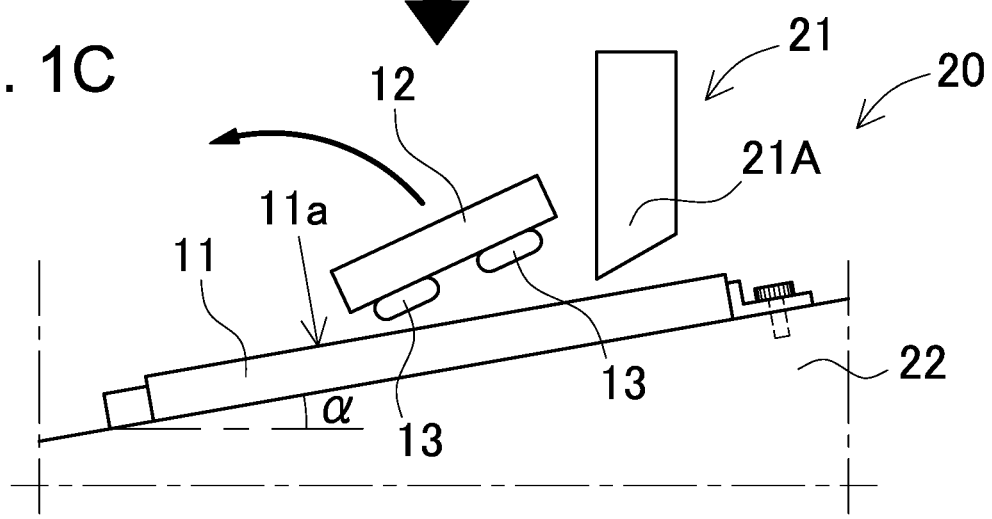

FIG. 1A to FIG. 1C schematically illustrate a method of testing a semiconductor element according to a first embodiment. FIG. 1A schematically shows a movement of a shear tool toward a semiconductor element, FIG. 1B schematically shows pressing of the semiconductor element with the shear tool, and FIG. 1C schematically shows detachment of the semiconductor element from the substrate. A semiconductor device produced by bonding a semiconductor element to a surface of a substrate is used, and a method of testing the semiconductor element bonded to the substrate for the bond strength as a testing method according to an embodiment, in the method the semiconductor element is detached from the substrate by pressing a peripheral surface of the semiconductor element with a shear tool, will be described below.

Providing Semiconductor Device 10

Semiconductor Device 10

A semiconductor device 10 shown in FIG. 1A to FIG. 1C includes a semiconductor element 12, a substrate 11 having a surface (the upper surface in the drawings) on which the semiconductor element 12 has been bonded, and bonding members 13 that bond a portion of a back surface 12a of the semiconductor element 12 to a surface 11a of the substrate 11.

Semiconductor Element 12

The semiconductor element 12 is preferably a semiconductor element that can be flip-chip mounted. For example, the semiconductor element 12 preferably has a structure including positive and negative electrodes on the same surface. Examples of the semiconductor element 12 include light-emitting elements and protective elements.

Substrate 11

The substrate 11 is a member that arranges the semiconductor element 12 mounted on its surface at a predetermined position and establishes electrical connection of the semiconductor element 12. The surface of the substrate is provided with wiring composed of a metal film in a predetermined pattern. Examples of the substrate 11 include a ceramic substrate in which a ceramic is provided with wiring.

Bonding Member 13

A plurality of bonding members 13 are disposed away from each other between the back surface 12a of the semiconductor element 12 and the surface 11a of the substrate 11. Examples of the bonding members 13 include metal members such as bumps. For example, the semiconductor element 12 that is flip-chip mounted includes a pair of positive and negative electrodes on the back surface 12a of the semiconductor element 12. The electrically-conductive bonding members 13 such as metal members bond the pair of electrodes to a pair of portions of the wiring on the surface 11a of the substrate 11. That is, the bonding members 13 make a space 14 between the back surface 12a of the semiconductor element 12 and the surface 11a of the substrate 11 in an area between at least two bumps connected to the electrodes.

The space in the semiconductor device may be filled with plastic. The overall light-emission efficiency of a semiconductor device including a light-emitting element as the semiconductor element can be improved by mixing white powder, which reflects light, into the plastic to be filled into the space so that light emitted downward from the light-emitting element is reflected. In the semiconductor device in which the space is filled with plastic, the plastic expands with thermal energy from the semiconductor element. The thermal expansion of the plastic in the space made by bonding exerts a force that pushes the semiconductor element up to detach the semiconductor element from the surface of the substrate. If the semiconductor element is small, the heat generated per unit area increases, and the temperatures of the semiconductor element and the plastic more greatly increase. Therefore, the plastic more greatly expands with heat, and the detaching force that is intended to detach the semiconductor element from the substrate increases. Detachment of the semiconductor element can be prevented by bonding the semiconductor element to the substrate with high bond strength. Accordingly, testing of the bond strength of the semiconductor element is particularly effective in order to increase the yield of the semiconductor device and improve the stability of the resulting product.

Each electrode of the semiconductor element 12 to be flip-chip mounted may be provided with two or more bonding members (such as bumps). For example, the positive and negative electrodes on the back surface 12a of the semiconductor element 12 having a quadrangular shape in a plan view can each be provided with a plurality of bonding members 13. That is, two or more bonding members are bonded to a single electrode. With this structure, a space is made between the back surface 12a of the semiconductor element 12 and the surface 11a of the substrate 11 also in an area other than the area between the positive and negative electrodes. FIGS. 1A to 1C each show the semiconductor device 10 in which the single semiconductor element 12 is disposed on the single substrate 11, but a plurality of semiconductor elements may be disposed on a single substrate to constitute a semiconductor device.

Pressing Peripheral Edge of Semiconductor Element 12 with Shear Tool 21

The bond strength of the semiconductor device 10 is tested with a die shear strength tester 20 (hereinafter also simply referred to as "tester") including a shear tool 21 as shown in FIGS. 1A to 1C. In the testing method according to the present embodiment, the surface 11a of the substrate 11 (the upper surface in the drawings), which is bonded to the semiconductor element 12, is inclined downward along the direction (indicated by the arrow A in FIG. 1B) of pressing with the shear tool 21. When the shear tool 21 presses the peripheral edge of the semiconductor element 12 in the horizontal direction while the surface of the substrate is inclined, the detaching force (F1) exerted in the direction perpendicular to the surface of the substrate acts on the semiconductor element 12 as shown in the schematic partial enlarged view of FIG. 2.

Figure 2:
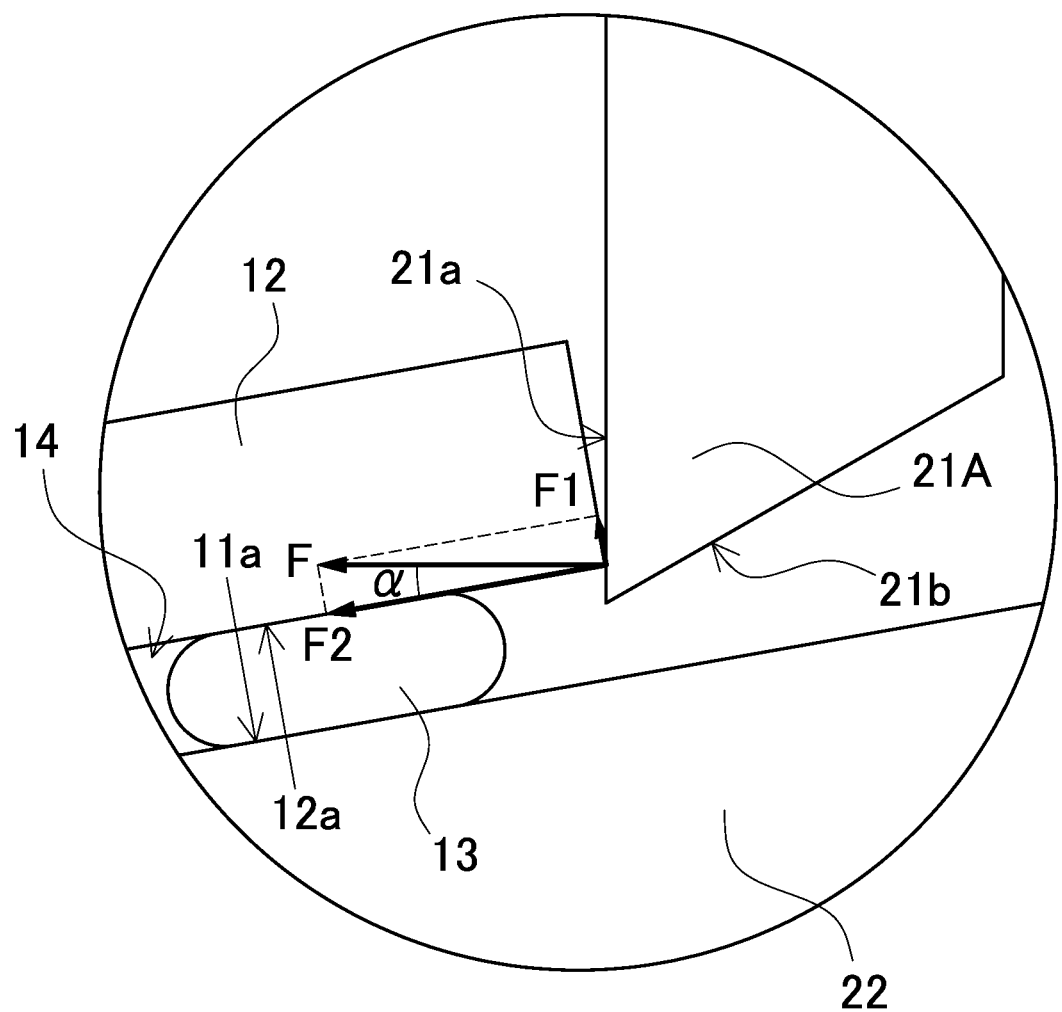
FIG. 2 is a schematic partial enlarged view showing pressing with a shear tool shown in FIG. 1B.

The detaching force (F1) can be increased by increasing the angle ($\alpha$) of inclination of the surface of the substrate. That is, the angle ($\alpha$) of inclination determines the detaching force (F1) relative to the horizontal pressing force (F) that is exerted by the shear tool 21 and that acts on the peripheral surface of the semiconductor element 12. The detaching force (F1) increases in proportion to the product of the pressing force (F) by the sine (sin) of the angle ($\alpha$) of inclination as represented by Equation 1 below. This is because the pressing force (F) is the vector sum of the detaching force (F1) and the shearing force (F2) lying along the surface of the substrate as shown in FIG. 2.

$$F1 = F \sin \alpha \quad \text{(Equation 1)}$$

The angle ($\alpha$) of inclination of the surface of the substrate, that is, the angle with respect to the direction of pressing with the shear tool 21, is preferably 5° or more, more preferably 10° or more, most suitably about 15° to increase the detaching force (F1). As for the substrate 11 inclined at an angle ($\alpha$) of inclination of 15° with respect to the direction of pressing with the shear tool 21, 26% of the pressing force (F) acting in the horizontal direction serves as the detaching force (F1) of the semiconductor element. The detaching force (F1) can be increased by increasing the angle ($\alpha$) of inclination, but an excessive increase in the angle ($\alpha$) of inclination reduces the space between the substrate 11 and the semiconductor element 12 in the horizontal direction and inhibits the movement of the shear tool 21 in the horizontal direction. Hence, the angle ($\alpha$) of inclination is preferably less than 45°, more preferably less than 30°.

The die shear strength tester 20 shown in FIGS. 1A to 1C is configured so that an upper surface 22a of a stage 22 is inclined with respect to the horizontal plane and so that the surface 11a of the substrate 11 set on the upper surface 22a of the stage 22 is at a predetermined angle ($\alpha$) of inclination with respect to the horizontal plane. The shear tool 21 is installed in the tester 20 such that the shear tool 21 can move in the horizontal direction relative to the stage 22. With the upper surface 22a of the stage 22 being inclined in the tester 20 having this structure, the direction of pressing with the shear tool 21 is a direction inclined to gradually head away from the surface of the substrate while the shear tool 21 is configured to move in the horizontal direction.

The shear tool 21 includes at its tip a pressing portion 21A that presses the peripheral edge of the semiconductor element 12. The semiconductor element 12 preferably has the shape of a plate that is quadrangular in a plan view. The shear tool 21 has, as the pressing portion 21A, a pressing surface 21a perpendicular to the direction of pressing. The pressing surface 21a of the shear tool 21 is brought into contact with and presses the peripheral edge, or a side of the quadrangular shape, of the semiconductor element 12, preferably a peripheral edge of the lower surface serving as the mounting surface. The lower surface of the pressing portion 21A of the shear tool 21 is a tapered surface 21b inclined downward along the direction of pressing. For example, the shear tool 21 is made of a high-speed tool steel such as SKH51 so that the peripheral edge of a thin semiconductor element 12 can be pressed with the pressing portion 21A provided at the tip. A predetermined width of the pressing surface 21a of the pressing portion 21A at the tip of the shear tool 21 is brought into contact with and presses the peripheral edge of the semiconductor element 12. With the pressing surface 21a of the shear tool being perpendicular to the direction of movement of the shear tool as described above, the pressing surface 21a can be brought into contact with and press a side of the periphery of the lower surface of the semiconductor element 12 having a quadrangular shape in a plan view.

The breaking load of the bonding members 13 can be measured by pressing the shear tool 21 in the horizontal direction until the bonding members 13 are broken as shown in FIG. 1C. The bond strength is accurately tested by applying the force that detaches the semiconductor element 12 in the direction perpendicular to the surface 11a of the substrate 11 while the shear tool 21 is moved in the horizontal direction. Accordingly, for example, the above testing method is useful for tests performed to select the bonding members 13 used for flip-chip mounting.

Figure 4:
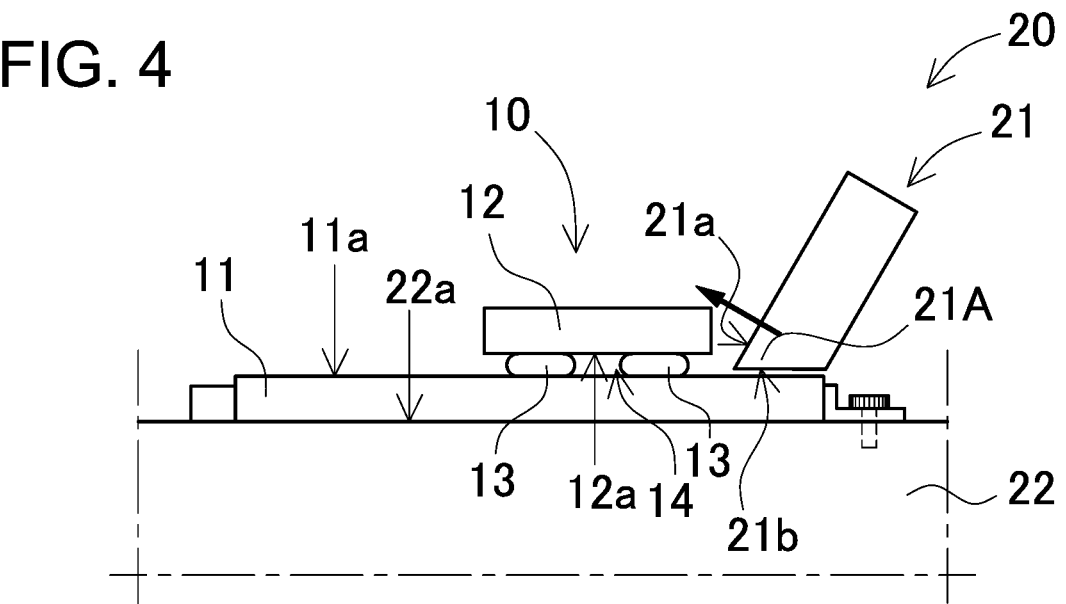
FIG. 4 schematically illustrates a method of testing a semiconductor element according to a modification.

The bond strength of the semiconductor element 12 is tested by moving the shear tool 21 in the horizontal direction in the above method, but the method of testing a semiconductor element is not limited to this method. For example, the bond strength of the semiconductor element 12 can be tested by causing the direction of pressing with the shear tool 21 to be inclined with respect to the surface of the substrate 11 and allowing the shear tool 21 to press the peripheral edge of the semiconductor element 12 as shown in FIG. 4 so that the detaching force (F1) is exerted. Accordingly, the bond strength of the semiconductor element 12 can also be tested by moving the shear tool 21 in a direction inclined upward along the direction of movement with the surface of the substrate 11 lying in the horizontal plane. Specifically, the direction of movement (direction of pressing) of the shear tool 21 is the direction inclined upward with respect to the surface of the substrate 11 set on the stage of the die shear strength tester, so that the direction of pressing with the shear tool 21 is a direction inclined to gradually head away from the surface of the substrate 11.

Figure 5:
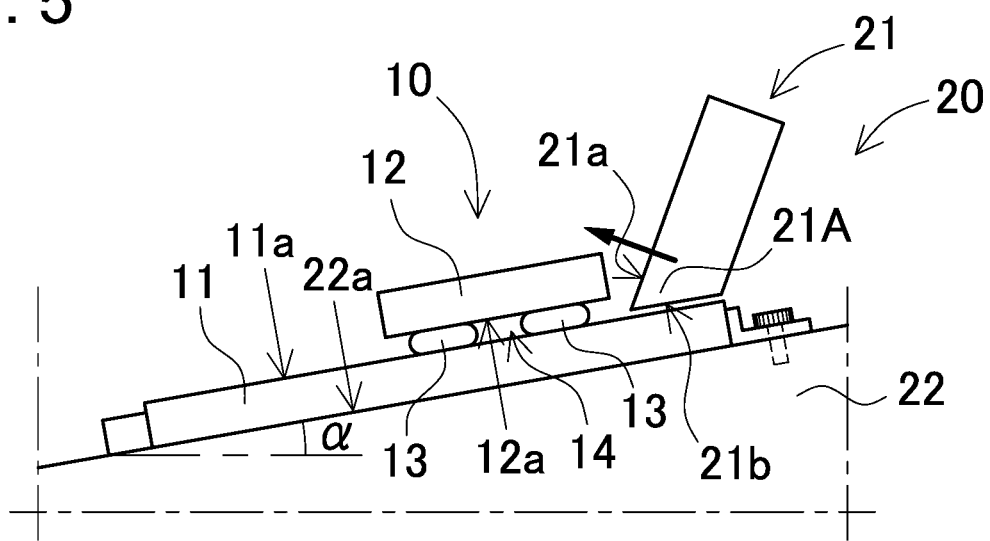
FIG. 5 schematically illustrates a method of testing a semiconductor element according to another modification.

Also, the bond strength of the semiconductor element 12 can be tested by causing the surface of the substrate and the direction of pressing with the shear tool 21 to be both inclined and moving the shear tool 21 such that the shear tool 21 presses the semiconductor element 12 in such a direction as to detach the semiconductor element 12 as shown in FIG. 5. Specifically, the direction of movement (direction of pressing) of the shear tool 21 is set to a direction inclined upward with respect to the horizontal plane, and the upper surface of the stage of the die shear strength tester and the surface of the substrate set on the stage are disposed in a direction inclined downward along the direction of movement (that is, the direction of pressing) of the shear tool 21, so that the direction of pressing with the shear tool 21 will be a direction inclined to gradually head away from the surface of the substrate. That is, the tester can be adjusted such that the surface of the substrate set on the upper surface of the stage is inclined relative to the direction of movement (that is, the direction of pressing) of the shear tool 21.

Second Embodiment

Figure 3A:
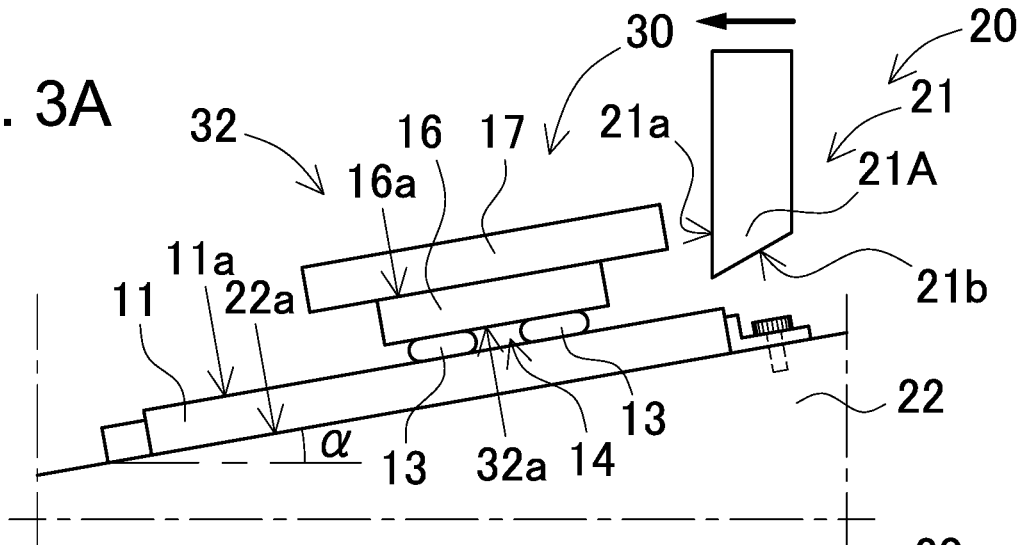
FIG. 3A to FIG. 3C schematically illustrate a method of testing a semiconductor element according to a second embodiment.
Figure 3B:
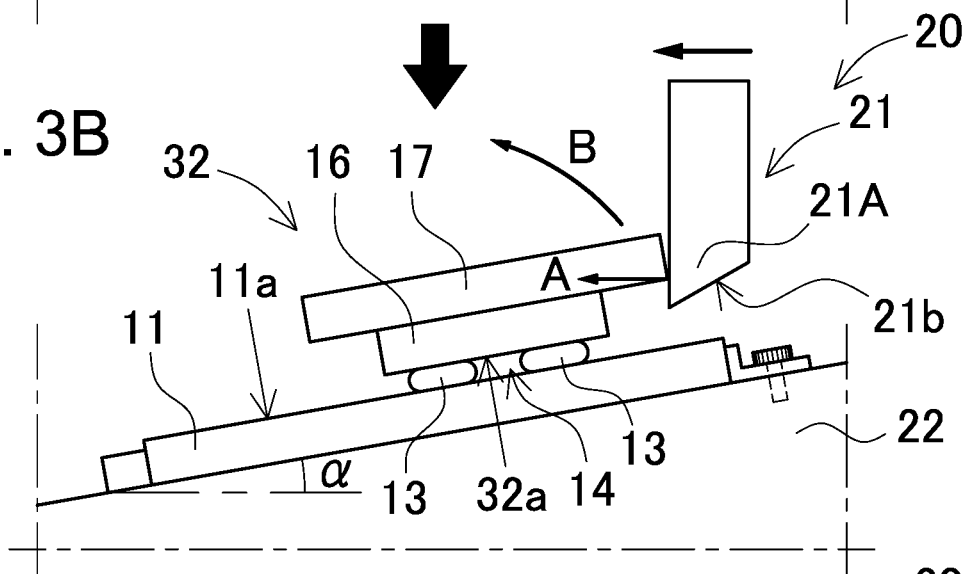
Figure 3C:
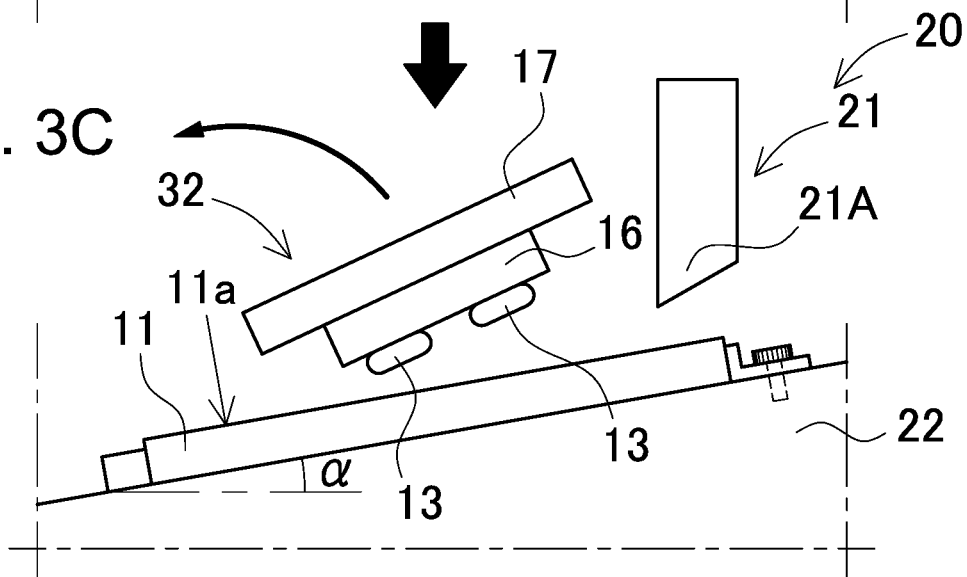

FIG. 3A to FIG. 3C schematically illustrate a method of testing a semiconductor element according to a second embodiment. FIG. 3A schematically shows a movement of the shear tool toward a semiconductor element, FIG. 3B schematically shows pressing of the semiconductor element with the shear tool, and FIG. 3C schematically shows detachment of the semiconductor element from the substrate. In the second embodiment, a semiconductor element 32 in which a phosphor plate 17 is disposed on a surface 16a of a light-emitting element 16 is used as the semiconductor element 32 in a semiconductor device 30 to be tested. Also in the semiconductor device 30, a back surface 32a of the semiconductor element 32 is bonded to the surface 11a of the substrate 11 with the bonding members 13. The differences from the first embodiment will be described.

In this embodiment, the semiconductor element 32 has a layered structure composed of the light-emitting element 16 and the phosphor plate 17, and a peripheral surface of the phosphor plate 17 disposed on the light-emitting element 16 serves as the peripheral surface of the semiconductor element to be pressed with the shear tool. The phosphor plate 17 has a larger outer shape than the light-emitting element 16 and is bonded to the surface 16a of the light-emitting element 16 (the upper surface of the light-emitting element 16 in the drawings). The phosphor plate 17 is a sintered body of a phosphor. The sintered body of the phosphor is formed into a plate and bonded to the surface 16a of the light-emitting element 16. The phosphor plate 17 is directly bonded to the surface 16a of the light-emitting element 16, and its bond strength is higher than the bond strength between the light-emitting element 16 and the substrate 11. The phosphor plate 17 having a larger outer shape than the light-emitting element 16 is bonded to the light-emitting element 16, so that the peripheral edge of the phosphor plate 17 is located outside the peripheral edge of the light-emitting element 16. The pressing surface 21a of the shear tool 21 is brought into contact with the peripheral surface of the semiconductor element 12, that is, the peripheral edge of the lower surface of the phosphor plate bonded to the light-emitting element, to press the semiconductor element 12.

The bond strength of the semiconductor element 32 described above is measured by pressing, with the shear tool 21, the peripheral surface of the phosphor plate 17 that extends from the peripheral edge of the light-emitting element 16 and is located outside the peripheral edge of the light-emitting element 16. As for the semiconductor element 32 in which the phosphor plate 17 has been bonded to the light-emitting element 16 so as not to be detached, the bond strength when the semiconductor element 32 is detached from the substrate 11 can be measured without detachment of the phosphor plate 17 from the light-emitting element 16 in the step of measuring the bond strength with the substrate 11 by pressing the peripheral edge with the shear tool 21.

In the above method, the bond strength can be measured by pressing the phosphor plate 17 disposed on the light-emitting element 16 with the shear tool 21, so that the gap between the lower edge of the shear tool 21 and the surface 11a of the substrate 11 is increased to allow the shear tool 21 to move in the horizontal direction. Accordingly, the bond strength of the semiconductor element 32 is more easily and surely tested. A moment of rotation in the direction indicated by the arrow B shown in FIG. 3B is applied to the semiconductor element 32 pressed with the shear tool 21 in the direction indicated by the arrow A in FIG. 3B. The moment of rotation is therefore applied so as to detach the semiconductor element 32 from the surface 11a of the substrate 11. The force that detaches the semiconductor element 32 from the substrate 11 is therefore increased, so that the bond strength is more accurately tested. The bond strength can be more accurately tested even in the case in which peripheral edge of the lower surface of the semiconductor element is covered with a bonding member such as electrically-conductive paste and Au—Sn eutectic solder. Further, the bond strength of the light-emitting element, which is provided with the phosphor plate on its surface, in a situation close to the situation in the finished product is tested by the above testing method.

Third Embodiment

Figure 6:
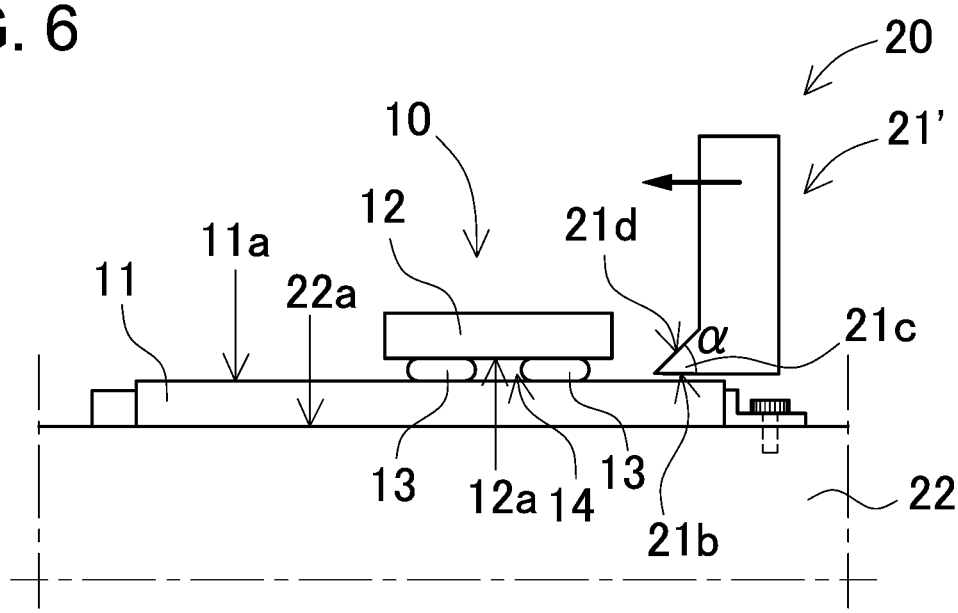
FIG. 6 schematically illustrates a method of testing a semiconductor element according to a third embodiment.

FIG. 6 schematically illustrates a method of testing a semiconductor element according to a third embodiment. In the above methods for testing a semiconductor element shown in FIG. 1A and FIG. 3A, a stress in a relative direction in which the semiconductor element 12 is pulled up and detached from the surface of the substrate 11 is applied by moving the shear tool 21 in the horizontal direction with the stage 22 and the semiconductor element 12 inclined. That is, by allowing the stage 22 and the surface of the substrate 11 to be inclined with respect to the direction of movement of the shear tool, the direction of pressing with the shear tool can be a direction inclined to head away from the surface of the substrate while the direction of movement of the shear tool 21 corresponds to the direction of pressing of the shear tool.

On the other hand, in the third embodiment, a stress in a relative direction in which the semiconductor element is pulled up and detached from the surface of the substrate is allowed to be applied by, for example, devising an appropriate shape of the shear tool while the shear tool is moved in the horizontal direction above the horizontal stage 22. As shown in FIG. 6, a shear tool 21' includes at its tip a projection 21c that presses the peripheral edge of the semiconductor element 12. The projection 21c has, as the pressing portion to be brought into contact with the semiconductor element 12, an inclined surface 21d inclined with respect to the direction of movement of the shear tool. The tip of the inclined surface 21d is inserted into the gap between the semiconductor element 12 and the substrate 11, so that the inclined surface 21d is brought into contact with the peripheral edge of the lower surface of the semiconductor element 12 (for example the lower right corner of the semiconductor element 12 in FIG. 6). When the shear tool 21' with such a structure is moved toward the semiconductor element, the point of contact between the projection 21c of the shear tool 21' and the semiconductor element 12 shifts upward. In other words, the point of contact between the projection 21c and the semiconductor element 12 moves upward along the inclined surface 21d of the projection as the tip of the projection 21c gets into the gap between the semiconductor element 12 and the substrate 11. The stress applied on the point of contact thus pushes the semiconductor element 12 upward. With the shear tool 21' having a projection having the inclined surface 21d as described above, a stress is applied in the direction in which the semiconductor element 12 is detached from the surface of the substrate 11 while the shear tool 21' is moved in a direction parallel to the stage and the upper surface of the semiconductor element 12, so that the bond strength of the semiconductor element can be easily tested. By this method, a stress in a direction in which the semiconductor element 12 is pulled up and detached from the surface of the substrate 11 is applied using the horizontal stage and a horizontal movement mechanism without using a mechanism that holds the stage or the shear tool in an inclined state or a mechanism that moves the shear tool in a slant direction.

The angle of inclination of the inclined surface of the shear tool with respect to the lower surface of the semiconductor element is preferably 30° or more and 60° or less. This allows the tip of the projection 21c of the shear tool to be easily inserted into the gap between the semiconductor element 12 and the substrate 11, so that a stress is applied in the direction in which the semiconductor element 12 is detached from the surface of the substrate 11.

Further, the relative movement between the semiconductor element and the shear tool in the present invention is not limited to the configuration in which the shear tool is moved while the semiconductor element is fixed. Needless to say, for example, the relative movement between the semiconductor element and the shear tool can be achieved also by moving the semiconductor element toward the shear tool while the shear tool is fixed.

A method of testing a semiconductor element of the present disclosure allows for easily testing the bond strength of a semiconductor element bonded to a substrate. The material, the positions, and the like of the bonding members can be selected on the basis of the test results.

It should be apparent to those with an ordinary skill in the art that while various preferred examples of the invention have been shown and described, it is contemplated that the invention is not limited to the particular examples disclosed, which are deemed to be merely illustrative of the inventive concepts and should not be interpreted as limiting the scope of the invention, and which are suitable for all modifications and changes falling within the spirit and scope of the invention as defined in the appended claims.

What is claimed is:

1. A method of conducting a shear strength test for bond strength on a semiconductor element bonded to a surface of a substrate, the method comprising
    pressing a peripheral surface of the semiconductor element with a shear tool in a direction inclined to gradually head away from the surface of the substrate along the direction of pressing to conduct a shear strength test with a die shear strength tester.

2. The method of conducting a shear strength test on a semiconductor element according to claim 1, wherein the surface of the substrate, which is bonded to the semiconductor element, is inclined downward along the direction of pressing with the shear tool.

3. The method of conducting a shear strength test on a semiconductor element according to claim 2, wherein the direction of pressing with the shear tool is a horizontal direction.

4. The method of conducting a shear strength test on a semiconductor element according to claim 1, wherein an angle of inclination of the direction of pressing with respect to the surface of the substrate is 5° or more.

5. The method of conducting a shear strength test on a semiconductor element according to claim 1, wherein the semiconductor element is a light-emitting element.

6. The method of conducting a shear strength test on a semiconductor element according to claim 5,
    wherein a phosphor plate is disposed on a surface of the light-emitting element, and
    wherein the shear tool presses the phosphor plate.

7. The method of conducting a shear strength test on a semiconductor element according to claim 1, wherein the shear tool presses a peripheral edge of a lower surface of the semiconductor element.

8. The method of conducting a shear strength test on a semiconductor element according to claim 1, wherein the semiconductor element is bonded to the substrate with a bump.

9. A method of conducting a shear strength test on a semiconductor element bonded to a surface of a substrate for a bond strength, comprising:
    pressing a peripheral surface of the semiconductor element with a shear tool in a direction parallel to the surface of the substrate to conduct a shear strength test with a die shear strength tester,
    wherein the shear tool has, as a pressing portion to be brought into contact with the semiconductor element, an inclined surface inclined with respect to the direction of pressing.

10. The method of conducting a shear strength test on a semiconductor element according to claim 9,
    wherein a tip of the shear tool has a projection protruding toward the semiconductor element, and
    wherein the inclined surface is a portion of the projection.

11. The method of conducting a shear strength test on a semiconductor element according to claim 9, wherein the semiconductor element is a light-emitting element.

12. The method of conducting a shear strength test on a semiconductor element according to claim 11,
    wherein a phosphor plate is disposed on a surface of the light-emitting element, and
    wherein the shear tool presses the phosphor plate.

13. The method of conducting a shear strength test on a semiconductor element according to claim 9, wherein the shear tool presses a peripheral edge of a lower surface of the semiconductor element.

14. The method of conducting a shear strength test on a semiconductor element according to claim 9, wherein the semiconductor element is bonded to the substrate with a bump.

* * * * *